Patented Feb. 4, 1936

2,029,627

UNITED STATES PATENT OFFICE 2,029,627

MANUFACTURE OF BASIC REFRACTORY MATERIAL

Richard L. Lloyd, Great Neck, N. Y., and Reed W. Hyde, Summit, N. J., assignors to Dwight & Lloyd Metallurgical Company, New York, N. Y., a corporation of New Jersey No Drawing. Application July 19, 1932, Serial No. 623,396

10 Claims. (Cl. 106—9)

This invention relates to a method for manufacturing basic refractory material, suitable for use in lining basic open hearth furnaces and the like, and applies more particularly to the manufacture of the same from such materials as dolomite or magnesite.

Heretofore it has been customary to manufacture basic refractory material by burning magnesite or dolomite in shaft kilns at temperatures of from 2,000° to 3,000° F., although, on account of the high cost of magnesite, its use is limited, so that dolomite is more commonly used in lining and repairing open hearth furnaces. Lump or coarsely crushed stone is ordinarily burned in shaft kilns, and after burning the product is crushed to the required size, usually half inch to quarter inch particles, and the fines discarded, since fine refractory material is considered unsuitable by most furnace operators.

Smaller sized stone is burned in rotary kilns, but the constant agitation produces large quantities of fines which also must be discarded.

The refractory materials heretofore made have not been entirely satisfactory for various reasons. Crushing the shaft kiln product to the required size involves heavy losses in fines with consequent increased cost of usable product. Rotary kiln product, while burned at a somewhat higher temperature than shaft kiln product and hence somewhat denser and more resistant to atmospheric moisture, is not so resistant but that it must be stored in air tight containers if it be kept for some time before use. It also is usually of an undesirable rounded or nodular shape, and rolls down the banks of the furnace, building up the bottom and reducing the metal holding capacity of the furnace. Furthermore, the fuel efficiency of the rotary kiln is low and repair and upkeep costs are high, so that the product is correspondingly expensive. As a result, the tendency in recent steel practice is to use the inexpensive crushed raw dolomite, in spite of the greater amounts required and the greater wear and tear on the furnace structure which the use of this material entails.

It has been discovered that a superior product can be made at low cost by highly forced draft combustion of fuel intermixed with the raw refractory material, whereby are attained extraordinarily high temperatures, sufficient to momentarily fuse the refractory material itself and to effect its transformation into a hard, dense, moisture resistant body which may be crushed to any desired size and which is of such physical condition as to be ideally adapted to the purpose in view. In accordance with the present invention the raw materials are treated preliminarily to the burning operation so as to promote the forced draft combustion of the fuel and the union of the raw refractory with the added flux materials while at the same time effecting removal of undesirable impurities.

Forced draft combustion depends upon ability to cause rapidly renewed contact of combustion supporting gases with the fuel to be burned, together with rapid removal of the evolved combustion gases. Other things being equal, the more rapidly combustion can be promoted the higher will be the temperature attained. Furthermore, the necessary gases can be more readily forced through or withdrawn from a bed composed of coarse particles and having comparatively large voids than is the case with a bed of fine particles. On the other hand, chemical action is more rapidly promoted between small particles of the reacting bodies, intimately associated, than between large particles which are in contact at only a few points. It is an object of the present invention to provide a method by which these seemingly opposed principles can be utilized in the economic production of a superior refractory material.

Although the novel features which are believed to be characteristic of this invention will be particularly pointed out in the claims appended hereto, the invention itself, as to its objects and advantages, and the manner in which it may be carried out, may be better understood by referring to the following description in which certain specific disclosures are made for purpose of explanation. It will be understood, however, that the processes and the steps thereof may be modified in various respects without departing from the broad aspects of the invention.

The invention will be described by way of illustration as used in the manufacture of dolomite refractory for use in basic open hearth steel furnaces, but it will be understood that it is likewise applicable to the manufacture of refractories for other uses and from other raw materials including both true magnesite and calcium bearing magnesite, high magnesia limestone and the like.

In carrying out the invention, the raw dolomite may first be ground to fine sizes, for example, fine enough to pass through a 40 mesh screen. It will be apparent that the fines from the quarrying operation, which are ordinarily screened out and thrown away or employed for such low value uses as road dressing, may be used in this invention, with consequent low cost of raw material. Unless naturally present in the stone in the desired proportions, the dolomite may require certain additions of the nature of fluxing materials to make a refractory of the required chemical composition, these additions depending both on the composition of the raw stone and on the use to which the refractory is to be put. For example, dolomite refractory for lining basic open hearth furnaces for use in refining low carbon high chrome steel, where the metal bath is held at approximately 3000° F. for several hours may contain 4% silica, 2% alumina and 8% iron oxide ($Fe_2O_3$), while for use in refining high carbon steels it might contain 6% or more silica, 2½ to 4% alumina and 8½% or even more iron oxide. It will be understood further that where the finished product is to be used in the treatment of other metals, appropriate metal oxides may be used, for example, for use in a furnace for treating nickel, nickel oxide might be added instead of the iron oxide above mentioned.

The addition material (iron oxide, for example) may be added in the form of mill scale, flue dust, iron ore, etc. Preferably, it may first be ground to the same size or finer than the stone, in order that an intimate mixture may be made. Iron blast furnace flue dust which is high in iron content is a good addition material, as it is already in finely divided condition. A small proportion of fine burned product or "returns" may also be added, for a purpose later described.

Fuel for burning the stone is also added to the mixture. The amount required varies with different materials, and is best determined by trial. Twelve pounds of coke fines to 100 pounds of fine dolomite containing 21% MgO and 31% CaO has been found suitable. This fuel may be coal, coke, retort carbon or other solid fuel, and preferably should be of a size slightly coarser than the stone and addition material. For example, coke ground to pass 12 mesh screen works satisfactorily with stone ground to pass 20 mesh screen. Finer fuel may be used, but the expense of fine grinding is avoided by utilizing fuel in coarser sizes.

It is obvious that materials so finely ground do not lend themselves to treatment by forced draft. Even if air be blown through a bed of such materials, the dust losses would be enormous. Consequently another step in the invention comprises converting the ground materials into a coarser, but not too coarse, form.

The ground stone, with addition material in desired amount and with the proportion of fuel (twelve per cent, more or less) as shown desirable by experience or trial is now thoroughly mixed to insure uniform composition throughout the mass. The mixture may then be moistened with water to which has been added magnesium oxychloride, and worked up (as by agitation) to a plastic consistency, such as a thick mortar or mud. Other agents, such as magnesium chloride, calcium chloride, etc., which act with the fine magnesia and lime bearing returns to form oxychloride bonding agents, may be used, but preferably an agent basically of the same nature as the desired refractory, i. e., one which will not permanently introduce undesirable elements, should be selected. Only a small amount of bonding agent is required; for example, in a certain mixture two pounds of magnesium chloride and six pounds of returns to 100 lbs. of ground stone has been found satisfactory. It will be understood that the proportion of bonding agent required will vary with the different mixtures, but in general, from two to ten percent will be found sufficient. It will of course be understood that the bonding agent may be added in fine, dry condition to the charge materials, and the mixture then be moistened, instead of adding it in the moistening water. The mortar-like mixture may now be allowed to harden, preferably while spread out as relatively thin slabs in order to facilitate the following crushing operation. When well hardened, the slabs may be broken up by suitable crushing apparatus into particles of approximately quarter inch size. The magnesium oxychloride bonding agent has an important effect, as it serves to maintain the dried mixture in the form of a relatively hard strong cake which can be crushed to the desired size without the production of an undue proportion of fines, whereas, if the mixture is moistened with water only, when dried it crushes to a mass of fines approximating the original mixture of fine materials. It also performs another function which will be described later.

The raw materials are now ready for the burning treatment. For this operation, apparatus such as the well-known Dwight-Lloyd sintering machine is well suited, although intermittent apparatus operating on the same principle may also be utilized. Whatever apparatus is used, it should be of a type in which a forced blast of air (combustion supporting gas) can be passed through the bed of material to provide intense, rapid combustion of the fuel without agitation of the raw materials.

The crushed fragments, preferably moistened slightly, may now be fed in a shallow bed on to the grates of the burning apparatus, care being taken to prevent packing which would hinder the even passage of air through the bed. The depth of bed most suitable depends on various factors, including available suction or pressure for forcing the air blast, proportion of voids in the bed, etc. as will be understood. From five to ten inches depth has been found satisfactory in practice, although deeper beds may be used to advantage in some instances.

The fuel in the upper layers of the bed may now be ignited, as by temporary application of flame from an oil or gas burner. Combustion is continued by a strong blast of air, forced or drawn through the bed of charge on the grates, and progresses rapidly downward through the bed, creating an intense heat of brief duration which not only calcines the lime magnesia carbonates but causes chemical reaction between the addition materials and the resulting oxides, and momentary fusion, so that the product, instead of being simply a mass of individual calcined dolomite particles, is largely cellular clinker or cake, the particles having been fused together by the extreme heat but without actually having been melted down to a molten mass in the brief time the high temperature lasts. Some of the particles, especially toward the top where the mass heat effect is less intense, may be unclinkered, though calcined. The operation is completed in ten to twenty minutes, and the cake is ready to be discharged from the grates.

As an illustration of the speed of combustion thus attained, a five inch bed of charge on the grates of a Dwight-Lloyd sintering machine was completely burned in twelve minutes, the suction as measured in the wind box being seven inches (water gauge) at the beginning and two and one-half inches at the finish. (With the fan at constant speed the suction diminishes and the air volume increases as the voids in the bed increase, due to shrinkage of the material in burning.)

It has been found impossible to measure directly the temperature produced in the bed of burning material. Surface temperatures of over 3000° F. have been read by optical pyrometer, but that these are considerably exceeded below the surface is shown by the fact that the surface portions are much less strongly clinkered than the product from the interior portions of the bed. Melting point tests made on this product showed that it melted at a temperature above 3400° F., and when it is considered that the formation temperature of a compound of this nature is appreciably higher than its melting point, the remarkably high temperatures attained may be realized.

During this forced draft burning treatment a highly desirable purification takes place. The dolomite itself is usually free from undesirable impurities but the addition materials may contain such elements as zinc, lead and the like, which are decidedly objectionable if introduced into the open hearth furnace. These are especially apt to be present if flue dust is the addition material used. Under the high heat, and especially in the presence of moisture, these impurities react with chloride from the chloride bond forming material to form volatile metal chlorides which pass off with the escaping combustion gases, leaving a purified refractory material. Thus it is not necessary that raw materials free from impurities of this class be used, which makes available a wide variety of lower cost raw materials.

The product as discharged from the grates is too coarse for most uses. It may be crushed in rolls or other crushing apparatus to the desired size, and if necessary the fines may be screened out, although it has been found that the proportion of fines made when a suitable type of crushing apparatus is used is so small that its removal is unnecessary. The clinker is hard and dense, irregularly angular in shape and hence admirably adapted to form furnace linings, the individual particles locking together to form steep banks without rolling down to the bottom of the furnace. It can be stored indefinitely, and is sufficiently strong to stand repeated handling.

If desired, the small proportion of unclinkered product may be removed by screening before the clinker is crushed. It is less dense than the clinkered portion, and though it makes an excellent refractory if used at once, it does not withstand moisture attack so well. If only the clinkered product is desired, however, the screenings may be re-treated, either alone or mixed with additional raw material.

As a variation of the invention, the fuel may, if desired, be mixed with the material after the other ingredients have been formed into the dried bonded fragments above described, instead of being mixed with the ground raw materials before bonding. In this case it is preferable to use slightly coarser fuel—for example, coke crushed through eight mesh screen, as the more finely ground fuel might tend to burn too rapidly and also might be blown away by the air currents before it was entirely consumed.

If a product stronger and coarser than is ordinarily produced in the above described operation should be desired, it may be obtained by crushing the cake to about eight mesh size, adding a small proportion of solid fuel (for example, five per cent of minus eight mesh coke has been found sufficient), thoroughly moistening the mixture and repeating the burning operation. Owing to the fact that the carbon dioxide has been removed in the first burning, which removal involves heavy shrinkage, there is little shrinkage during this second burning and as a result a more massive, dense cake is produced. This cake, when crushed, (for example, to pass a screen having half inch openings) is found to be composed of the same irregularly angular fragments as the first product, but the fragments are denser, even more resistant to water, and break to larger sizes. Consequently, where a product is desired that must be handled many times or be stored in bins for a prolonged period before use, the twice burned material is preferable.

The "returns" or fine burned product added to the charge are helpful for several reasons. When magnesium or calcium chloride is used as bonding agent, the returns (especially the unfused portion) furnish the magnesia and lime needed for the cementing reaction. (This, of course, is not necessary when oxychlorides are added direct). Furthermore, the returns contain already fused particles, which act as nuclei for the initiation of the reactions at a multitude of points throughout the bed. As is well known, slag forming compounds (this refractory material being of this general class) melt at temperatures considerably below their formation temperatures. These already formed particles scattered through the mass, promote and speed up the formation of similar compounds from the raw charge ingredients, thereby decreasing the time required and hence making possible increased output from the plant.

In the foregoing description of the invention various proportions of materials and order of steps in the process are set forth by way of illustration, but it will be understood by those skilled in the art that other proportions may be used in specific cases and that the order of carrying out the steps may to some extent be varied without departing from the spirit of the invention.

The invention provides a method of manufacturing a basic refractory material at low cost which is hard, dense and of a physical character exceptionally favorable for lining and repairing open hearth furnaces. As the raw materials, in finely sub-divided condition, may be thoroughly intermixed, the resulting product is uniform throughout. The operation may be carried out continuously by the use of well known standardized apparatus, at a high rate of speed and consequently at low cost.

What is claimed is:

1. Method for the manufacture of refractory material, which comprises comminuting a raw material selected from the group consisting of magnesite and dolomite, mixing therewith fine sized fluxing materials, bonding said mixture with an hydraulic cement comprising an oxychloride of an alkaline earth compound, converting said bonded mixture into coarse sized pieces, as compared to the fine raw materials, adding fuel, and burning the mixture by forced draft combustion of the intermixed fuel, whereby high temperatures are obtained at which the raw materials are transformed into a clinkered, hard burned refractory product.

2. Method for the manufacture of refractory material which comprises grinding to fine particles a raw material selected from the group consisting of magnesite and dolomite, mixing therewith a small proportion of fine size fluxing materials, solid fuel in small particles and a small proportion of an hydraulic cement comprising an oxychloride of an alkaline earth compound, wetting the mixture to a mortar-like consistency, causing the particles to be bonded together by the setting of the bonding agent, crushing the bonded mixture to coarse sized pieces as compared to the fine raw materials, and burning the fuel by forced draft combustion whereby high temperatures are attained at which the raw materials are decomposed and the oxides are caused to combine with the flux material and the materials are momentarily fused to form a clinkered hard burned refractory product.

3. Method for the manufacture of refractory material which comprises mixing with finely ground particles of a raw material selected from the group consisting of magnesite and dolomite, a small proportion of fine size fluxing material and a bond forming material adapted to produce magnesium or calcium oxychloride cement, wetting and working the mixture to a plastic consistency, hardening said mixture by the setting of the bond forming material, crushing said hardened mixture to pieces coarse as compared with the fine raw materials, mixing solid fuel with said coarse crushed particles, moistening the mixture and spreading it in a shallow bed on a perforate bottom support, burning the fuel while causing currents of combustion supporting gas to be passed through the bed under pressure, thereby promoting rapid combustion of said fuel with the production of high temperature heat whereby the raw materials are converted into a hard burned clinkered refractory material.

4. Method for the manufacture of refractory material which comprises wetting a mixture of finely ground material selected from the group, consisting of dolomite and magnesite, solid fuel and a flux material together with a small proportion of fine previously burned product and a bonding agent comprising a chloride of magnesium or calcium, working the moistened mixture to a plastic mass, hardening said mass, by the setting action of the bonding material, crushing said hardened mass to relatively coarse fragments, moistening said fragments and spreading them in a shallow even layer on a perforate bottom support, and burning said fuel at a rapid rate under forced draft caused to pass through said layer whereby the materials are converted into a clinkered refractory product, screening said product, returning the fine portion to succeeding charges and crushing the coarse portion to predetermined sizes for use as a refractory.

5. Method for the manufacture of refractory material which comprises wetting a mixture of finely ground material selected from the group consisting of dolomite and magnesite, a small proportion of fine iron oxide bearing material and fine fuel with a bonding material adapted to form magnesium or calcium oxychloride bonding agent, working the mixture to a plastic mass, hardening said mass by the setting of the bonding material, crushing said hardened mass to fragments relatively coarse as compared to the fine raw materials, burning said fuel under forced draft of air whereby the mixed materials are converted to a clinkered mass of partially fused refractory material.

6. Method for the manufacture of refractory material which comprises wetting a mixture of finely ground dolomite, blast furnace flue dust, fine solid fuel and burned poorly clinkered material from a preceding charge with magnesium or calcium chloride, hardening the wetted mixture by setting of oxychloride cement, crushing the hardened mass to relatively coarse fragments, spreading the fragments in a relatively shallow layer on a pervious support and burning the fuel under forced draft of air caused to pass through the layer and the support at a rapid rate whereby the mixed materials are converted to a partially clinkered mass, separating the poorly clinkered portion and returning it to a succeeding charge, and crushing the clinkered portion to predetermined sizes.

7. Method for the manufacture of refractory material which comprises wetting a mixture of finely ground particles of a material selected from the group consisting of magnesite and dolomite, a fluxing material containing oxide of the metal in the treatment of which the refractory is to be used, fine fuel and a bond forming material comprising a material adapted to form oxychloride of magnesia or lime, hardening the mixture by the setting of the oxychloride bonding material, crushing the hardened material to relatively coarse particles, spreading the particles in a shallow layer on a pervious support, igniting the fuel and burning the same under forced draft of air currents caused to pass rapidly through the layer whereby the materials are converted to a mass of clinkered refractory material.

8. Method for the manufacture of refractory material from dolomite which comprises grinding the dolomite to pass 40 mesh screen, adding thereto fine iron oxide bearing material in amount such that the finished product will contain less than six per cent silica and from six to fifteen percent iron and alumina, adding from two to ten per cent magnesium oxychloride forming bonding agent, and ten to fifteen percent of fine solid fuel, mixing the materials, moistening the mixture to a mortar-like consistency, spreading the moistened mass in thin layers and drying the same whereby the particles are bonded together by the setting of the bonding agent, crushing the bonded mass to pieces of a size to pass a four mesh screen, moistening the pieces, spreading them in an even, shallow layer on a perforate bottom support, igniting the fuel and burning the same under forced draft while currents of air are caused to pass at rapid rate through the layer, whereby a high temperature is produced in the layer and the materials are converted to a clinkered refractory material.

9. Method for the manufacture of refractory material which comprises wetting a mixture of finely ground dolomite, fine iron oxide bearing material, and fine fuel with magnesium or calcium oxychloride forming material, working the mixture to a plastic mass, causing said mass to harden by setting of the oxychloride, crushing the hardened mass to particles of a size to pass quarter inch screen opening, moistening the particles, spreading them in a shallow even layer on a pervious support and burning the fuel by forced draft of air currents caused to pass rapidly through the bed whereby a partially clinkered cake is formed, crushing said cake to sizes to pass a quarter inch screen opening, mixing therewith additional fine fuel, moistening the mixture and re-burning the same under forced draft while spread in a shallow layer whereby a well-clinkered, hard burned, cellular cake of dense refractory material is formed.

10. Method for the manufacture of refractory material which comprises grinding to fine particles a raw material selected from the group consisting of magnesite and dolomite, mixing therewith a small proportion of fine iron ore or flue dust, fine fuel and a small proportion of a bonding material adapted to form magnesium or calcium oxychlorides, moistening the mixture to a plastic consistency, hardening said mixture by the setting of the oxychloride cement, crushing said hardened mixture to coarse size particles as compared to the fine raw materials, spreading said particles in a shallow bed on a grate bottom support and burning the fuel by forced draft combustion while causing rapid currents of air to pass through the bed whereby heat is developed at a high temperature and impurities in said mixture are caused to form volatile chlorides, and removing said chlorides with the waste water gases.

RICHARD L. LLOYD.
REED W. HYDE.